US009958527B2

(12) United States Patent
Tuxen

(10) Patent No.: US 9,958,527 B2
(45) Date of Patent: May 1, 2018

(54) METHOD AND A SENSOR FOR DETERMINING A DIRECTION-OF-ARRIVAL OF IMPINGENT RADIATION

(71) Applicant: TRACKMAN A/S, Vedbæk (DK)

(72) Inventor: Fredrik Tuxen, Hørsholm (DK)

(73) Assignee: TRACKMAN A/S, Vedbaek (DE)

( * ) Notice: Subject to any disclaimer, the term of this patent is extended or adjusted under 35 U.S.C. 154(b) by 415 days.

(21) Appl. No.: 14/365,251

(22) PCT Filed: Dec. 13, 2012

(86) PCT No.: PCT/EP2012/075425
§ 371 (c)(1),
(2) Date: Jun. 13, 2014

(87) PCT Pub. No.: WO2013/087787
PCT Pub. Date: Jun. 20, 2013

(65) Prior Publication Data
US 2014/0347212 A1    Nov. 27, 2014

Related U.S. Application Data

(60) Provisional application No. 61/576,609, filed on Dec. 16, 2011.

(30) Foreign Application Priority Data

Dec. 27, 2011  (EP) ..................... 11195784

(51) Int. Cl.
*G01S 3/48* (2006.01)
*G01S 13/44* (2006.01)
*G01S 3/14* (2006.01)

(52) U.S. Cl.
CPC ................. *G01S 3/48* (2013.01); *G01S 3/14* (2013.01); *G01S 13/4454* (2013.01)

(58) Field of Classification Search
CPC .......... G01S 13/4454; G01S 3/14; G01S 3/46; G01S 3/48
See application file for complete search history.

(56) References Cited

U.S. PATENT DOCUMENTS 3,025,520 A    3/1962  Werner et al.
3,264,643 A    8/1966  Nilssen
(Continued)

FOREIGN PATENT DOCUMENTS

DE    2620991    3/1977
EP    0529489    3/1993
(Continued)

OTHER PUBLICATIONS

International Search Report dated Apr. 3, 2013, issued in counterpart International Application NO. PCT/EP2012/075425.
(Continued)

*Primary Examiner* — Matthew M Barker
(74) *Attorney, Agent, or Firm* — Fay Kaplun & Marcin, LLP

(57) ABSTRACT

A sensor for determining a direction-of-arrival of radiation impingent on the sensor which has antennas positioned in a particular set-up different from a rectangle, so that information may be derived between two pairs of the antennas, positioned in corners of a rectangular grid and additional information may be derived from an additional antenna, combined with one of the "grid" antennas forming a third pair of antennas. The additional antenna is positioned away from the corners and other pre-defined lines of the rectangle/grid. In this manner, such as from phase differences between the pairs of antennas, more information may be derived compared to antennas positioned merely at the corners of a
(Continued)

rectangle to remove ambiguous angles of direction-of-arrival without compromising accuracy of an angular determination.

22 Claims, 5 Drawing Sheets

(56) References Cited

U.S. PATENT DOCUMENTS

| | | | |
|---|---|---|---|
| 3,324,468 A | 6/1967 | Knepper | |
| 3,540,054 A | 11/1970 | Broderick | |
| 3,777,665 A | 12/1973 | Ziemba | |
| 3,798,644 A | 3/1974 | Constant | |
| 3,798,795 A | 3/1974 | Michelsen | |
| 3,856,237 A | 12/1974 | Torian et al. | |
| 3,974,740 A | 8/1976 | Billottet et al. | |
| 3,981,010 A | 9/1976 | Michelsen | |
| 3,992,708 A | 11/1976 | Olson et al. | |
| 4,015,258 A | 3/1977 | Smith et al. | |
| 4,050,068 A | 9/1977 | Berg et al. | |
| 4,264,907 A | 4/1981 | Durand, Jr. et al. | |
| 4,477,814 A | 10/1984 | Brumbaugh et al. | |
| 4,509,052 A | 4/1985 | Cash | |
| 4,545,576 A | 10/1985 | Harris | |
| 4,563,005 A | 1/1986 | Hand et al. | |
| 4,622,554 A | 11/1986 | Gellekink et al. | |
| 4,639,733 A | 1/1987 | King et al. | |
| 4,713,686 A | 12/1987 | Ozaki et al. | |
| 4,717,916 A | 1/1988 | Adams et al. | |
| 4,751,511 A | 6/1988 | Komata et al. | |
| 4,780,719 A | 10/1988 | Frei et al. | |
| 5,018,218 A | 5/1991 | Peregrim et al. | |
| 5,056,791 A | 10/1991 | Poillon et al. | |
| 5,092,602 A | 3/1992 | Witter et al. | |
| 5,134,409 A | 7/1992 | Groot | |
| 5,138,322 A | 8/1992 | Nuttall | |
| 5,150,895 A | 9/1992 | Berger | |
| 5,241,317 A | 8/1993 | Howard | |
| 5,246,232 A | 9/1993 | Eccher et al. | |
| 5,290,037 A | 3/1994 | Witler et al. | |
| 5,319,373 A | 6/1994 | Maxwell et al. | |
| 5,341,142 A | 8/1994 | Reis et al. | |
| 5,342,051 A | 8/1994 | Rankin et al. | |
| 5,357,255 A | 10/1994 | Giraudy | |
| 5,375,832 A | 12/1994 | Witler et al. | |
| 5,401,026 A | 3/1995 | Eccher et al. | |
| 5,404,144 A * | 4/1995 | Vlannes | G01S 3/48 342/13 |
| 5,406,290 A | 4/1995 | James et al. | |
| 5,413,345 A | 5/1995 | Nauck | |
| 5,486,002 A | 1/1996 | Witler et al. | |
| 5,489,099 A | 2/1996 | Rankin et al. | |
| 5,495,249 A | 2/1996 | Chazelle et al. | |
| 5,609,534 A | 3/1997 | Gebhardt et al. | |
| 5,631,654 A | 5/1997 | Karr | |
| 5,652,588 A | 7/1997 | Miron | |
| 5,657,027 A * | 8/1997 | Guymon, II | G01S 3/48 342/442 |
| 5,700,204 A | 12/1997 | Teder | |
| 5,781,505 A | 7/1998 | Rowland | |
| 5,796,474 A | 8/1998 | Squire et al. | |
| 5,803,823 A | 9/1998 | Gobush et al. | |
| 5,846,139 A | 12/1998 | Bair et al. | |
| 5,868,578 A | 2/1999 | Baum | |
| 5,873,040 A | 2/1999 | Dunn et al. | |
| 5,879,246 A | 3/1999 | Gebhardt et al. | |
| 5,912,700 A | 6/1999 | Honey et al. | |
| 5,952,957 A | 9/1999 | Szu | |
| 6,042,492 A | 3/2000 | Baum | |
| 6,057,915 A | 5/2000 | Squire et al. | |
| 6,067,039 A | 5/2000 | Pyner et al. | |
| 6,133,946 A | 10/2000 | Cavallaro et al. | |
| 6,179,720 B1 | 1/2001 | Rankin et al. | |
| 6,198,501 B1 | 3/2001 | Nemiroff et al. | |
| 6,239,747 B1 * | 5/2001 | Kaminski | G01S 3/023 342/147 |
| 6,244,971 B1 | 6/2001 | Mihran | |
| 6,252,632 B1 | 6/2001 | Cavallaro | |
| 6,266,005 B1 | 7/2001 | Schneider | |
| 6,292,130 B1 | 9/2001 | Cavallaro et al. | |
| 6,304,665 B1 | 10/2001 | Cavallaro et al. | |
| 6,320,173 B1 | 11/2001 | Vock et al. | |
| 6,371,862 B1 | 4/2002 | Reda | |
| 6,400,306 B1 | 6/2002 | Nohara et al. | |
| 6,421,116 B1 | 7/2002 | Schilli et al. | |
| 6,450,442 B1 | 9/2002 | Scneider et al. | |
| 6,456,232 B1 | 9/2002 | Milnes et al. | |
| 6,520,864 B1 | 2/2003 | Wilk | |
| 6,547,671 B1 | 4/2003 | Mihran | |
| 6,592,465 B2 | 7/2003 | Lutz | |
| 6,621,561 B2 | 9/2003 | Holton | |
| 6,764,412 B2 | 7/2004 | Gobush et al. | |
| 6,778,148 B1 * | 8/2004 | Pack | H01Q 21/22 343/844 |
| 6,791,217 B2 | 9/2004 | Collier-Hallman et al. | |
| 6,816,185 B2 | 11/2004 | Harmath | |
| 6,903,676 B1 | 6/2005 | Frady | |
| 6,956,523 B2 | 10/2005 | Mohan | |
| 6,989,789 B2 * | 1/2006 | Ferreol | G01S 3/043 342/374 |
| 7,026,990 B2 * | 4/2006 | Cooper | G01S 3/74 342/156 |
| 7,031,873 B2 | 4/2006 | Song | |
| 7,132,975 B2 | 11/2006 | Fullerton et al. | |
| 7,133,801 B2 | 11/2006 | Song | |
| 7,161,733 B2 | 1/2007 | Fukata et al. | |
| 7,183,966 B1 | 2/2007 | Schramek et al. | |
| 7,213,442 B2 * | 5/2007 | Workman | G01N 29/0618 342/424 |
| 7,321,330 B2 | 1/2008 | Sajima | |
| 8,054,216 B2 * | 11/2011 | Kinoshita | G01S 13/4454 342/118 |
| 8,085,188 B2 | 12/2011 | Tuxen | |
| 8,189,857 B2 | 5/2012 | Johnson et al. | |
| 8,461,965 B2 * | 6/2013 | Chen | G01S 13/4445 340/10.1 |
| 8,665,153 B2 * | 3/2014 | Nakagawa | G01S 3/74 342/378 |
| 8,845,442 B2 | 9/2014 | Tuxen | |
| 8,866,665 B2 * | 10/2014 | Suzuki | G01S 13/345 342/107 |
| 8,912,945 B2 | 12/2014 | Tuxen | |
| 9,036,864 B2 | 5/2015 | Johnson et al. | |
| 9,645,235 B2 | 5/2017 | Tuxen | |
| 2002/0075475 A1 | 6/2002 | Holton | |
| 2002/0107078 A1 | 8/2002 | Collins | |
| 2002/0114493 A1 | 8/2002 | McNitt et al. | |
| 2003/0027655 A1 | 2/2003 | Lutz et al. | |
| 2003/0076255 A1 | 4/2003 | Ono | |
| 2003/0103684 A1 | 6/2003 | Gobush et al. | |
| 2004/0032363 A1 | 2/2004 | Schantz et al. | |
| 2004/0032970 A1 | 2/2004 | Kiraly | |
| 2004/0156035 A1 | 8/2004 | Rogers | |
| 2004/0248662 A1 | 12/2004 | Gobush et al. | |
| 2005/0030222 A1 | 2/2005 | Steudel | |
| 2005/0030333 A1 | 2/2005 | Takahashi et al. | |
| 2006/0092075 A1 | 5/2006 | Bruce et al. | |
| 2006/0169932 A1 | 8/2006 | Fukata et al. | |
| 2007/0167247 A1 | 7/2007 | Lindsay | |
| 2007/0293331 A1 | 12/2007 | Tuxen | |
| 2008/0021651 A1 | 1/2008 | Seeley et al. | |
| 2008/0048907 A1 * | 2/2008 | Matsuura | G01S 3/808 342/147 |
| 2008/0068463 A1 | 3/2008 | Claveau et al. | |
| 2008/0139330 A1 | 6/2008 | Tuxen | |
| 2008/0261711 A1 | 10/2008 | Tuxen | |
| 2009/0295624 A1 | 12/2009 | Tuxen | |
| 2011/0250939 A1 | 10/2011 | Nobler | |
| 2011/0286632 A1 | 11/2011 | Tuxen et al. | |
| 2011/0304497 A1 | 12/2011 | Molyneux et al. | |
| 2013/0271323 A1 * | 10/2013 | Joo | G01S 3/48 342/442 |

(56) References Cited

U.S. PATENT DOCUMENTS

| | | |
|---|---|---|
| 2013/0274025 A1 | 10/2013 | Luciano, Jr. et al. |
| 2013/0346009 A1 | 12/2013 | Winter et al. |
| 2014/0191896 A1 | 7/2014 | Johnson et al. |
| 2014/0347212 A1 | 11/2014 | Tuxen |
| 2016/0170015 A1 | 6/2016 | Tuxen |
| 2016/0243423 A1 | 8/2016 | Tuxen et al. |
| 2016/0247292 A1 | 8/2016 | Tuxen et al. |
| 2016/0306035 A1 | 10/2016 | Johnson |
| 2016/0306036 A1 | 10/2016 | Johnson |
| 2016/0306037 A1 | 10/2016 | Johnson |
| 2016/0313441 A1 | 10/2016 | Tuxen |
| 2016/0320476 A1 | 11/2016 | Johnson |
| 2016/0339320 A1 | 11/2016 | Johnson et al. |

FOREIGN PATENT DOCUMENTS

| | | | |
|---|---|---|---|
| EP | 1158270 | 11/2001 | |
| GB | 2283144 | 4/1995 | |
| GB | 2294403 | 5/1996 | |
| GB | 2319834 | 6/1998 | |
| GB | 2380682 | 4/2003 | |
| JP | 559137873 | 8/1984 | |
| JP | H06126015 | 5/1994 | |
| JP | H06213989 | 8/1994 | |
| JP | H08266701 | 10/1996 | |
| JP | 2000230974 | 8/2000 | |
| JP | 2001305528 | 10/2001 | |
| JP | 2003098255 | 4/2003 | |
| JP | 3870233 | 1/2007 | |
| JP | 2007163321 | 6/2007 | |
| JP | 2008249354 | 10/2008 | |
| JP | 4388639 | 12/2009 | |
| WO | 1990008936 | 8/1990 | |
| WO | 1991006348 | 5/1991 | |
| WO | 1993004382 | 3/1993 | |
| WO | 1999027384 | 6/1999 | |
| WO | 2000062090 | 10/2000 | |
| WO | 2002025303 | 3/2002 | |
| WO | 2003005281 | 1/2003 | |
| WO | 2003032006 | 4/2003 | |
| WO | 2004031680 | 4/2004 | |
| WO | 2005017553 | 2/2005 | |
| WO | 2005081014 | 9/2005 | |
| WO | 2005116678 | 12/2005 | |
| WO | 2006002639 | 1/2006 | |
| WO | 2006002640 | 1/2006 | |
| WO | 2008/038005 | 4/2008 | |
| WO | WO 2010125790 A1 * | 11/2010 | ............... G01S 3/74 |
| WO | 2011092813 | 8/2011 | |
| WO | 2016/110757 | 7/2016 | |

OTHER PUBLICATIONS

Ruoyo et al., "Radar Reflected Signal Process of High Spinning Rate Projectiles", The Eighth International Conference on Electronic Measurement and Instruments, 2007, pp. 3-982-3-985.

Wei et al., "A New Method for Spin Estimation Using the Data of Doppler Radar", ICSP, 2000, pp. 1911-1914.

Masuda et al., "Measurement of Initial Conditions of a Flying Golf Ball", WEAM 4-4, 1994, pp. 344-347.

Christensen et al., "Doppler-Surface Mapping Technique for Characterisation of Spinning Cylinders Illuminated by Radar", A&E Systems Magazine, Aug. 2005, pp. 19-24.

Ong et al., "Signal-Adapted Wavelets for Doppler Radar System", Seventh Annual Conference on Control, Dec. 2002, pp. 19-23.

"Technology", Zelocity, Golf Performance Monitors, Copyright 2004-2006, Retrieved Jun. 9, 2010.

"3D Doppler Ball Tracking Monitors, Golf Radars and Launch Monitors", Flightscope, Copyright 2009, Retrieved Jun. 9, 2010.

Lolck, "TERMA Elektronik AS: Doppler Radar Spin Measurement", Brochure, 1986.

"DR 5000 User's Guide: DR 5000 Spin Calculation", DR 5000 User's Guide, 2004, pp. 27-45 and 48-59.

Bosse et al., "Improved radar tracking using a multipath model: maximum likelihood compared with eigenvector analysis", IEEE Proc. Radar, Sonar Navig., Aug. 1994, vol. 141, No. 4, pp. 213-222.

Blackaby, "Simultaneous RF/EO tracking and characterization of dismounts", MSc Thesis, 2008, 52 Sheets.

Fasano et al., "Radar/electro-optical data fusion for non-cooperative Uas sense and avoid", Aerospace Science and Technology, 2015, vol. 46, pp. 436-450.

Warthman; Technical Note D-1138: Project Echo—Boresight Cameras for recording antenna point accuracy; NASA, Sep. 1961, 14 sheets.

* cited by examiner

METHOD AND A SENSOR FOR DETERMINING A DIRECTION-OF-ARRIVAL OF IMPINGENT RADIATION

CROSS REFERENCE TO RELATED APPLICATIONS

This is a national stage application under 35 U.S.C. § 371 of International Application No. PCT/EP2012/075425, filed Dec. 13, 2012, and claims the benefit of European Application No. 11195784.1, filed Dec. 27, 2011 and U.S. Provisional Application No. 61/576,609, filed Dec. 16, 2011, the disclosures of all of which are incorporated herein by reference.

The present invention relates to a method and a sensor for determining a direction-of-arrival of impingent radiation and more particularly to the avoidance of ambiguous direction determinations in phase-comparison monopulse radars.

The phase-comparison monopulse principle is one of the most widely used methods for narrow band tracking radars to determine angular displacement of a target and other angle/direction-of-arrival determining systems. The phase-comparison monopulse technique is being used in e.g. pulse radars, pulse Doppler radars, CW Doppler radars and FMCW Doppler radars, but is also being used by telemetric receivers. The key concept of the phase-comparison monopulse technique is to measure the delay of an incoming wave front with a quasi-stationary frequency from a receiving antenna to another, physically separated, receiving antenna. The typically very short time delay is measured by measuring the phase difference of the received wave between the two receivers, which is possible due to the quasi-stationary nature of the frequency with a wavelength $\lambda$ of the reflected or emitted signal from the target to be tracked.

It is well known that increasing the separation D between the receiving antennas directly increases the angular sensitivity of the radar. To maximize the accuracy, it is thus desirable to maximize the separation D between the receiving antennas. However, since a phase difference between two signals can only be measured unambiguously within $\pm\pi$ radians, only in the case of the receiver separation being less than half the wavelength $\lambda$ of the received signal, can the angle to the object be determined unambiguously. As soon as the separation D gets bigger than $\lambda/2$, the conversion from phase difference to angle gets ambiguous.

In the past, the above limitation has been worked around in different ways. For the majority of phase-comparison monopulse determining systems, the ambiguity problem is solved by using narrow beam antennas that only receive energy coming from a limited field of view where there is no ambiguity present.

The present invention solves the above-mentioned problem by e.g. adding an additional receiving antenna placed physically in a particular relationship relative to the other receiving antennas. The additional receiving antenna preferably is placed such that the phase comparison between the additional receiving antenna and at least one of the original receiving antennas creates an ambiguity shift at different angles compared to the original receivers. This means that based on one single received radar pulse, the angle to the target can be determined unambiguously.

The present invention removes the compromise that so far has been made between coverage of the receiving antennas at a given point in time and the accuracy of the angular measurement using the phase-comparison monopulse principle. Separating the design constraints between instantaneous field-of-view coverage and obtainable accuracy opens a variety of new designs of radar systems and other direction-of-arrival determining systems and as such has a big commercial value.

In a first aspect, the invention relates to a sensor for determining a direction-of-arrival of radiation impingent on the sensor comprising:
  no more than 6 receiving antennas each being configured to sense the radiation and output a corresponding signal and of which:
    at least 3 of the receiving antennas are first receiving antennas which define corners of a parallelogram having two first and two second parallel sides,
    one or more of the receiving antennas is/are second receiving antenna(s), each second antenna forming a pair of antennas with another of the no more than 6 receiving antennas, where the antennas of each pair are positioned, in relation to each other, in the same relationship as an antenna positioned, in relation to one of the first receiving antennas, more than 1% of a smallest distance between two first receiving antennas away from all axes extending through any pair of: each of the four corners of the parallelogram and a centre point of each of the four sides of the parallelogram and
  a processor configured to receive the output signals and derive the direction-of-arrival from phase differences in the corresponding signals between the antennas of at least one of the pairs of antennas.

In this respect, the "direction-of-arrival" is the direction of the radiation impingent on the sensor. Impingent means that the radiation is directed toward the sensor from a position away therefrom. Typically, this will be the direction toward a source of the radiation, such as a target element from which the radiation is reflected or emitted.

Presently, microwave radiation is the preferred type of radiation, as the present invention is very suitable for radar applications, such as for tracking flying objects or the like. In this type of environment, microwave radiation has a number of advantages. However, it is noted that the same problems will be seen for all types of radiation and all frequencies, from x-ray to radio waves or even longer wavelengths.

In the present aspect, the sensor has no more than 6 antennas. In this respect, an antenna is an element being configured to sense the radiation and output a corresponding signal. Usually, the corresponding signal will have a parameter, such as current, voltage, frequency or numerical content, relating to an amplitude/intensity of the signal received. Typically, the radiation will have a periodic content, such as a frequency, whereby the output signal would vary correspondingly. In this respect, even though the antenna may comprise multiple sensing elements, the antenna is a single element outputting a single signal.

In certain circumstances, the output signal is generated not only based on the radiation received but with the use of e.g. an internal reference, such as an internal signal. In standard radars, an internal reference signal which also has been used for transmitting radiation toward the target, is combined with the signal output of the receiving antennas to generate a periodic signal (down converted from the radiation wavelength to a baseband signal) which then relates to variations seen by the radiation in its path from radar to radar via the target, usually a frequency modulation caused by movement of the target in relation to the radar. This combination with a reference signal may be performed in the present antennas, so that the output signal already is the resulting, such as down converted, signal.

When 3 or 4 of the receiving antennas are positioned in corners of an imaginary parallelogram, at least two receiving antennas are provided along a first side thereof and at least two are provided along another side thereof having an angle to the first side. Thus, the receiving antennas may be used for a 3-dimensional direction-of-arrival determination of a radiation emitting element.

In a preferred embodiment, the parallelogram is a rectangle, but in principle, any angle between the sides may be used. It is noted that many of the axes will coincide in this particular embodiment.

Whether 3 or 4 first receiving antennas are used in the corners of the parallelogram is not a manner of obtaining more measuring capability but a question of sensitivity in that now 2×2 antennas are positioned in each direction, providing a higher sensitivity than if only 2 antennas are used.

When the antennas are mutually separated by at least 0.6 times the wavelength of the received microwave radiation, the problem with ambiguity is especially seen.

When positioning the second receiving antenna in the particular relationship to one of the other receiving antennas, such as one of the first receiving antennas, the pair of the other receiving antenna and the second receiving antenna will provide a phase difference which provides additional information which may be used for removing ambiguity which is caused by the phase differences between the first receiving antennas positioned in corners of sides of the parallelogram.

It is noted that the second receiving antenna may provide this information together with any of the first receiving antennas, which may then be the other antenna of the pair of antennas, or when positioned in any position in relation to the first receiving antennas, if a separate other antenna is positioned correctly in relation to the second receiving antenna to obtain the desired positional relationship which generates the sought for phase difference information.

It is noted that the antennas usually will have a physical extent, whereby the positions of the antennas typically will be a center thereof. Thus, parts of an antenna may be positioned closer than 1% of the distance from an axis while the center thereof is not.

In preferred embodiments, the second antenna(s) is/are not positioned closer than 2%, such than not closer than 5%, such as not closer than 10% of the distance.

Then, a processor may be used for receiving the output signals and derive the direction-of-arrival from phase differences in the corresponding signals between the antennas of at least one of the pairs of antennas. Usually, the direction-of-arrival is also derived from phase differences of pairs of the first receiving antennas, where the receiving antennas of each pair of the first antennas are positioned in corners of the same side of the parallelogram.

Naturally, the processor may be an ASIC, an FPGA, a DSP, a signal processor, a single processor or a distributed processing network. The processor may be software programmable or hardwired—or a combination thereof.

The direction-of-arrival may be determined in one dimension by using the phase differences of only the first receiving antennas provided on a single side of the parallelogram, if the used second receiving antenna(s) is/are provided on a line coinciding with this side of the parallelogram.

Alternatively, the direction-of-arrival may be determined in two dimensions, where at least 3 of the first receiving antennas are used, where the position of the second receiving antenna(s) may then be chosen more independently.

The determination of a phase difference is simple to the skilled person. It is, however, clear that also other methods exist where not directly a phase difference is determined but equivalent data, such as a time difference describing the path difference taken by the radiation to reach the individual antennas, or a measure of the path difference itself, may equally well be used. Phase differences are typically used for periodical or quasi periodical signals, which is also the preferred type of radiation in accordance with the invention.

The manner of determining the direction-of-arrival on the basis of the phase differences and the manners of removing or reducing the ambiguities will be described further below.

Another aspect of the invention relates to a method of determining a direction-of-arrival of radiation impingent on a sensor comprising no more than 6 receiving antennas each being configured to sense the radiation and output a corresponding signal and of which:

at least 3 of the antennas are first receiving antennas define corners of a parallelogram having two first and two second parallel sides, one or more of the receiving antennas is/are second receiving antenna(s), each second antenna forming a pair of antennas with another of the no more than 6 receiving antennas, where the antennas of each pair are positioned, in relation to each other, in the same relationship as an antenna positioned, in relation to one of the first receiving antennas, more than 1% of a smallest distance between two first receiving antennas away from all axes extending through any pair of: each of the four corners of the parallelogram and a centre point of each of the four sides of the parallelogram and the method comprising deriving the direction-of-arrival from phase differences in the corresponding signals between the antennas of at least one of the pairs of antennas.

A third aspect of the invention relates to a method of determining a direction-of-arrival of radiation impingent on a sensor comprising a plurality of receiving antennas each being configured to sense the radiation and output a corresponding signal, the method comprising:

positioning the receiving antennas so that 3 or more first receiving antennas of the receiving antennas are positioned at different positions along a first direction, two of the first antennas being positioned with a distance, D, there between, one of the first antennas being positioned between the two first antennas at a position more than D*1% away from a position directly between the two first antennas, determining the direction-of-arrival from at least:
a phase difference between the two first antennas, and
a phase difference between one of the two first antennas and the one antenna.

Consequently, a more simple set-up is provided requiring only 3 receiving antennas provided on a single straight line and with different distances there between. It is clear that one distance between the receiving antennas, keeping the angle and radiation wavelength constant, will provide one set of possible angle candidates, and a sensible selection of the other difference will provide another set of angle candidates. Combining or comparing these candidates will remove or reduce the possible ambiguous angles.

A fourth aspect of the invention relates to a method of determining a direction-of-arrival of radiation impingent on a sensor comprising a plurality of receiving antennas each being configured to sense the radiation and output a corresponding signal, the method comprising:

positioning the receiving antennas so that:
- at least 3 of the receiving antennas are first receiving antennas define corners of a parallelogram having two first and two second parallel sides,
- one or more of the receiving antennas is/are second receiving antenna(s), each second receiving antenna forming a pair of antennas with another of the plurality of receiving antennas, where the antennas of each pair are positioned, in relation to each other, in the same relationship as an antenna positioned, in relation to one of the first receiving antennas, more than 1% of a smallest distance between two first receiving antennas away from all axes extending through any pair of: each of the four corners of the parallelogram and a centre point of each of the four sides of the parallelogram and determining the direction-of-arrival from at least:
- a phase difference between a first pair of the first receiving antennas positioned on one of the first parallel sides,
- a phase difference between a second pair of the first receiving antennas positioned on one of the second parallel sides, and
- a phase difference between at least one of the pairs of antennas being a second receiving antenna and the, pertaining, other of the antennas.

Compared to the third aspect, this aspect relates to a two-dimensional determination where the receiving antennas are positioned in relation to two directions which are not identical, whereby a non-zero angle exists there between. Preferably, the two directions are perpendicular to each other, so that the parallelogram is a rectangle, but any non-zero angle may be used.

Opposed to the third aspect, the receiving antennas for each dimension or direction need not be provided on a line along the direction. The receiving antennas may be provided a distance therefrom. This has a number of advantages in that antenna(s) used for one dimension may be re-used for also the other direction.

In general, 3 or more first receiving antennas are used which define corners of an imaginary parallelogram or which define two non-parallel directions as well as distances between the first receiving antennas along these directions. Naturally, one or more of the first receiving antennas may be provided on both directions and will be positioned in a corner of two sides of the parallelogram.

The particular manner of deriving the direction-of-arrival relates to the use of at least three phase differences derived from pairs of the first receiving antennas, selected to be positioned along the two directions or sets of non-parallel sides of the parallelogram, as well as a specifically chosen set/pair of receiving antennas including the second receiving antenna, where the particular positional relationship exists between the second receiving antenna and the other antenna, such as a first receiving antenna. The positional relationship of the pair(s) of antennas comprising a second antenna ensures additional information to the determination of the direction-of-arrival.

In this respect, several pairs of a second receiving antenna and pertaining other antenna may exist. Naturally, in this situation, the phase difference of these pair(s) is that between the pertaining second receiving antenna and the other antenna.

As mentioned further above, the phase difference may be replaced by another measure, such as a time difference or a path difference which is another manner of describing the same phenomenon: the fact that the radiation reaches the receiving antennas from a direction and thus may reach the receiving antennas at different points in time as it will travel different distances.

In a preferred embodiment of any of the above aspects, the radiation is at least substantially periodic, such as periodic in time, such as with a sine-like shape. This may be the situation where a signal is amplitude or frequency modulated and is combined (beated or summed/multiplied) with itself. This will be the typical situation in many instances, such as in radar technology.

In that or another embodiment, which is also relevant to all aspects of the invention, the method further comprises the step of directing radiation toward a target which subsequently generates the impingent radiation by reflecting at least part of the radiation directed toward the target. This is also typical in radar equipment which then also has a transmitter for providing the radiation, which radiation or a signal representing it may be used in the above combination in order to arrive at an output signal with a periodic signature.

In general, it is desired that the radiation is impingent on all antennas and that the antennas are provided on a common substrate, such as a flat panel which optionally may be movable or rotatable if desired.

In a preferred embodiment, the determining step comprises estimating, for each pair of receiving antennas, one or more candidate angles and subsequently determining the direction-of-arrival on the basis of a set of candidate angles comprising one candidate angle from each pair of receiving antennas. The candidate angles of the set having the lowest sum of difference angles relative to any direction, the direction-of-arrival may be selected as the direction of that set.

The very nature of the ambiguity is that a number of angles will provide the same phase difference and thus cannot be separated from each other using only two receiving antennas. Thus, for each phase difference, using two receiving antennas, a number of candidate angles may be derived. Selecting the distances between the antenna pairs to be different, or generally selecting the positions of the antennas of the pair sensibly, the candidate angles for another distance or relative position will be different. Thus, comparing the candidate angles, such as for each dimension, will provide candidate angles of one antenna pair which does not coincide with any candidate angles of the other antenna pair(s), but at least one angle from one pair will coincide, at least within a measurement error, with one from the other pair(s).

Thus, having generated the two or more sets of candidate angles (one for each antenna pair), a direction may be determined for each set, where the direction of the set is that having the lowest sum of difference angles to the candidate angles of the set. The direction-of-arrival may then be determined as the direction of the set having the lowest sum of difference angles. This may be a simple minimizing operation.

A particular advantage of all aspects of the present invention is that the ambiguity may be handled even though the sensor has a large field of view relative to the monopulse distance D between the receiving antennas. Thus, preferably, the sensor of the invention has a separation of the receiving antennas which is more than 1.2 times the width of at least one of the receiving antennas in the corresponding dimension.

A fifth aspect of the invention relates to a method of tracking a trajectory of a target in flight, the projectile reflecting or emitting radiation, the method comprising:

at least once, determining a direction-of-arrival of radiation reflected by or emitted by the target using the method of any of the second and fourth aspects of the invention, tracking the trajectory using a radar and correcting the trajectory using the direction-of-arrival determined.

In this aspect, the target may be any type of flying object, such as a launched projectile, a sports ball or the like. The target may emit the radiation or reflect radiation directed toward it.

The tracking of the trajectory of the target is performed using a radar, which receives radiation from the target and transforms this into information defining the trajectory. Naturally, the radar may also be able to perform the determination of the direction-of-arrival, if suitably equipped with a receiving antenna structure according to the invention and the correct software running on its processor.

The correction of the trajectory may be performed on the basis of one or a few determined directions-of-arrival, such as if the radar performs a usual trajectory determination on the basis of a measurement which has the ambiguity problem, where the direction-of-arrival determination may be performed and the trajectory already determined or the trajectory to be determined is then corrected.

Alternatively, the full trajectory or a major part thereof may be determined on the basis of data also used in the direction-of-arrival determination so that this determination is performed most of the time. The trajectory thus is initially generated in the correct manner.

A sixth aspect of the invention relates to a sensor for determining a direction-of-arrival of radiation impingent on the sensor comprising a plurality of receiving antennas each being configured to sense the radiation and output a corresponding signal, the sensor comprising:

3 or more first receiving antennas of the receiving antennas being positioned at different positions along a first direction, two of the first antennas being positioned with a distance, D, there between, one of the first antennas being positioned between the two first antennas at a position more than D*1% away from a position directly between the two first antennas, a determining element configured to receive the output signals from the first receiving antennas and determine the direction from at least:

a phase difference between the two first receiving antennas, and a phase difference between the one antenna and one of the two antennas.

This is similar to the third aspect, and the comments of the above aspects are equally valid for this sixth aspect.

A seventh aspect of the invention relates to a sensor for determining a direction-of-arrival of radiation impingent on the sensor comprising a plurality of receiving antennas each being configured to sense the radiation and output a corresponding signal, the antennas being positioned so that:

at least 3 of the receiving antennas are first receiving antennas define corners of a parallelogram having two first and two second parallel sides, one or more of the receiving antennas is/are second receiving antenna(s), each second receiving antenna forming a pair of antennas with another of the no more than 6 receiving antennas, where the antennas of each pair are positioned, in relation to each other, in the same relationship as an antenna positioned, in relation to one of the first receiving antennas, more than 1% of a smallest distance between two first receiving antennas away from all axes extending through any pair of: each of the four corners of the parallelogram and a centre point of each of the four sides of the parallelogram and the sensor further comprising a determining element configured to receive the output signals from the first receiving antennas and the antennas of at least one of the pairs of antennas and determine the direction-of-arrival from at least:

a phase difference between a first pair of the first receiving antennas positioned on one of the first parallel sides, a phase difference between a second pair of the first receiving antennas positioned on one of the second parallel sides, and a phase difference between the antennas of at least one of the pairs of antennas comprising a second antenna.

This corresponds to the fourth aspect, and all comments made in relation to any of the above aspects of the invention are equally relevant to this aspect.

In a preferred embodiment, the impingent radiation is at least substantially periodic, such as periodic in time, as is described further above.

A preferred sensor further comprises a transmitter for directing radiation toward a target which subsequently may generate the impingent radiation by reflecting at least part of the radiation directed toward the target.

Preferably, the determining element is configured to estimate, for each pair of receiving antennas, one or more candidate angles and subsequently determine the direction-of-arrival on the basis of a set of candidate angles comprising one candidate angle from each pair of receiving antennas, the candidate angles of the set having the lowest sum of difference angles relative to any direction, the direction-of-arrival being selected as the direction of that set.

Naturally, other minimization operations may be used, such other techniques to find the direction-of-arrival that fits best with the candidate angles.

A final aspect of the invention relates to a sensor for tracking a trajectory of a target in flight, the target reflecting or emitting radiation, the sensor comprising a sensor according to any of the first and third aspects of the invention, and wherein the determining element is configured to:

from the output signals from at least part of the receiving antennas, derive a trajectory of the target and correct the trajectory using the determined direction-of-arrival.

As mentioned in relation to the fifth aspect, the correction may be performed during or after the trajectory is determined, and the trajectory may be generated using a usual radar, which has the ambiguity problem, or using a radar which is able to determine also the direction-of-arrival, so that the trajectory is, in fact, correct from the start.

In the following, preferred embodiments will be described with reference to the drawing, wherein.

PHASE-COMPARISON MONOPULSE PRINCIPLE

Figure 1:
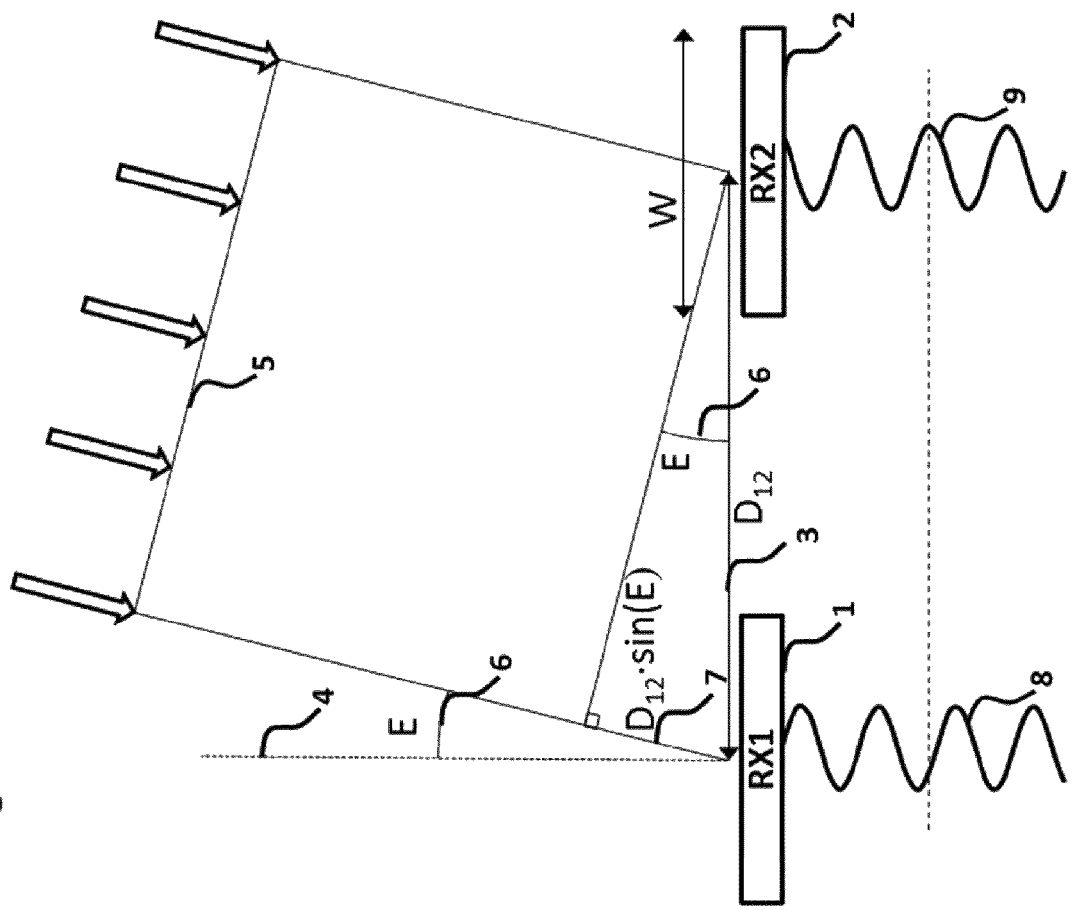
FIG. 1 illustrates a prior art monopulse receiving radar.

Consider a standard radar receiver with two separate receiving antennas 1 (RX1) and 2 (RX2) in FIG. 1, the receiving antennas RX1 and RX2 are separated by the distance 3 ($D_{12}$). The incoming wave front 5 reflected from a target arrives at an angle 6 (E) relative to a line 4 which is 90 degrees relative to the line 3 going through the two receiving antennas 1 and 2. Due to the angle 6 (E), the signal received by receiving antenna 1 travels an additional distance 7 which equals $D_{12} \cdot \sin(E)$.

Consequently, the phase difference, $\theta_{12}$, in radians between the received signal 8 from the receiving antenna RX1 compared to the signal 9 from receiving antenna RX2 will be phase shifted an amount equal to the distance 7 divided by the wavelength $\lambda$ multiplied with $2\pi$, see equation [1].

$$\theta_{12} = 2\pi \frac{D_{12} \cdot \sin(E)}{\lambda} \quad [1]$$

Equation [1] has been used by all phase-comparison monopulse tracking radars to determine the physical angle to a target from a measured phase difference $\theta_{12}$ between two physically separated antennas, RX1 and RX2.

Since a phase difference between two periodic signals can only be measured unambiguously within $\pm\pi$ radians, the phase difference $\theta_{12}$ essentially includes $N_{12}$ times $2\pi$, where the ambiguity index $N_{12}$ is an integer number like −2, −1, 0, 1, 2 etc. Consequently, equation [1] can be rewritten to [2], where $\theta_{12amb}$ is the phase difference which is directly measured and which always will be within $\pm\pi$ radians.

$$\sin(E) = \left(\frac{\theta_{12amb}}{2\pi} + N_{12}\right)\frac{\lambda}{D_{12}} \quad [2]$$

In the special case of $N_{12}=0$, $\theta_{12amb}$ equals $\theta_{12}$ in equation [1]. Since sin(E) always will be absolute less than 1, there is an upper absolute limitation on ambiguity index $N_{12}$ which can be used in equation [2], see equation [3].

$$|N_{12}| \leq \text{floor}\left(\frac{D_{12}}{\lambda} + 0.5\right) \quad [3]$$

In table 1 the number of useable $N_{12}$'s are listed for a couple of different distances $D_{12}$ between the receiving antennas RX1 and RX2.

TABLE 1

Ambiguity index $N_{12}$ versus receiver separation $D_{12}$

| Receiver separation, $D_{12}$ | Ambiguity index, $N_{12}$ |
|---|---|
| ≤λ/2 | 0 |
| ≤3λ/2 | −1, 0, 1 |
| ≤5λ/2 | −2, −1, 0, 1, 2 |
| ≤10 λ/2 | −5, −4, −3, −2, −1, 0, 1, 2, 3, 4, 5 |

Figure 2:
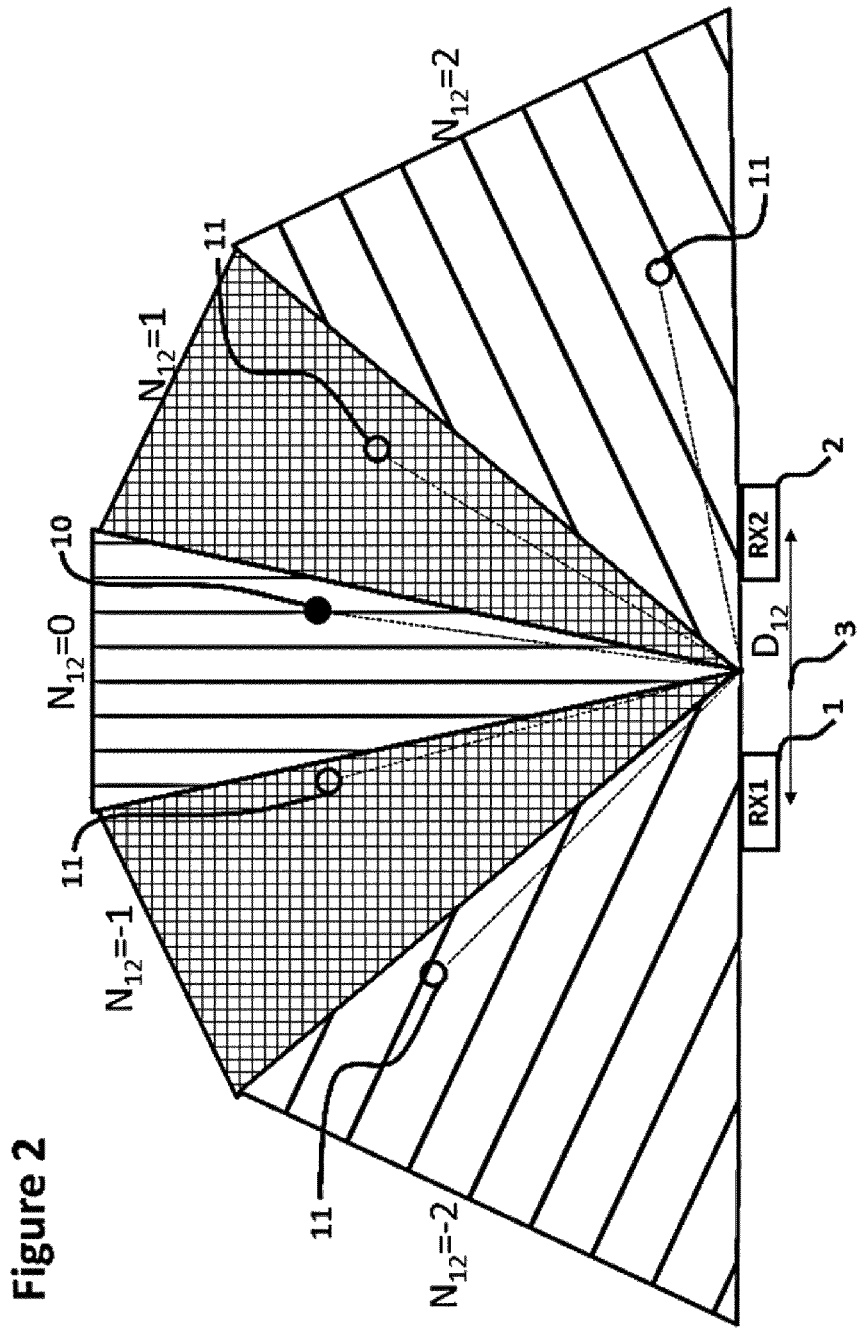
FIG. 2 illustrates ambiguity in the radar of FIG. 1

For a target located at position 10 in FIG. 2 relative to the receiving antennas 1 and 2, this means that from only the directly measured phase difference $\theta_{12amb}$, there is no way of telling whether the target is located at position 10 or at one of the positions 11 in FIG. 2. The "ghost positions" 11 in FIG. 2 corresponds to the ambiguity index $N_{12}$ being −2, −1, 1, 2 instead of the, in this case, correct ambiguity index $N_{12}=0$.

The above described ambiguity problem has always been a challenge for phase-comparison monopulse receiver systems in order to determine the angle to targets relative to the receiver orientation. This has been overcome by either 1) assuming an initial ambiguity index, or by 2) over time observing angular movement of the target and correlating this with predetermined 'likely' movement of the target. For most phase-comparison monopulse radars solution 1) has been used. For the assumption of ambiguity index $N_{12}$ equal to 0 to be valid, it is necessary that the receiver beam width is sufficiently narrow to eliminate the likehood of getting ambiguity index'es $N_{12}$ that are not 0. For a receiving antenna with a physical width of W in the direction parallel to the direction between receiving antenna RX1 and RX2, the narrowest 3 dB beam width possible in this dimension will be given by [4].

$$BW_{3dB} = \pm a\sin\left(\frac{\lambda}{2.26 \cdot W}\right) \quad [4]$$

The angle range corresponding to ambiguity index $N_{12}$ is 0 is given by [5].

$$\theta_{N_{12}=0} = \pm a\sin\left(\frac{\lambda}{2 \cdot D_{12}}\right) \quad [5]$$

This means that if the antenna dimension W in one dimension is greater than 1.13 times the distance $D_{12}$ between the receiver antennas in the same dimension used for the phase-comparison monopulse, then there will be ambiguity in the direction-of-arrival determination of the incoming wave. Meaning, unless the present invention is used, or additional information is provided, then the direction-of-arrival determination will be ambiguous.

Monopulse Resolving of the Phase Ambiguity

To solve the above ambiguity problem, an additional receiving antenna 12 (RX4) may be provided.

Large-number antenna sensors are known as e.g. Phased array receivers which consist of a number of receivers arranged in a grid, typically linearly spaced. These systems are capable of determining the direction-of-arrival of the reflected/emitted wave from a target, but only if the spacing of at least one of the rows or columns of the receivers is less than λ/2. The present embodiment is based on only adding one additional receiving antenna RX4 being placed at a different distance than $D_{12}$ from either receiving antenna RX1 or RX2.

Figure 3:
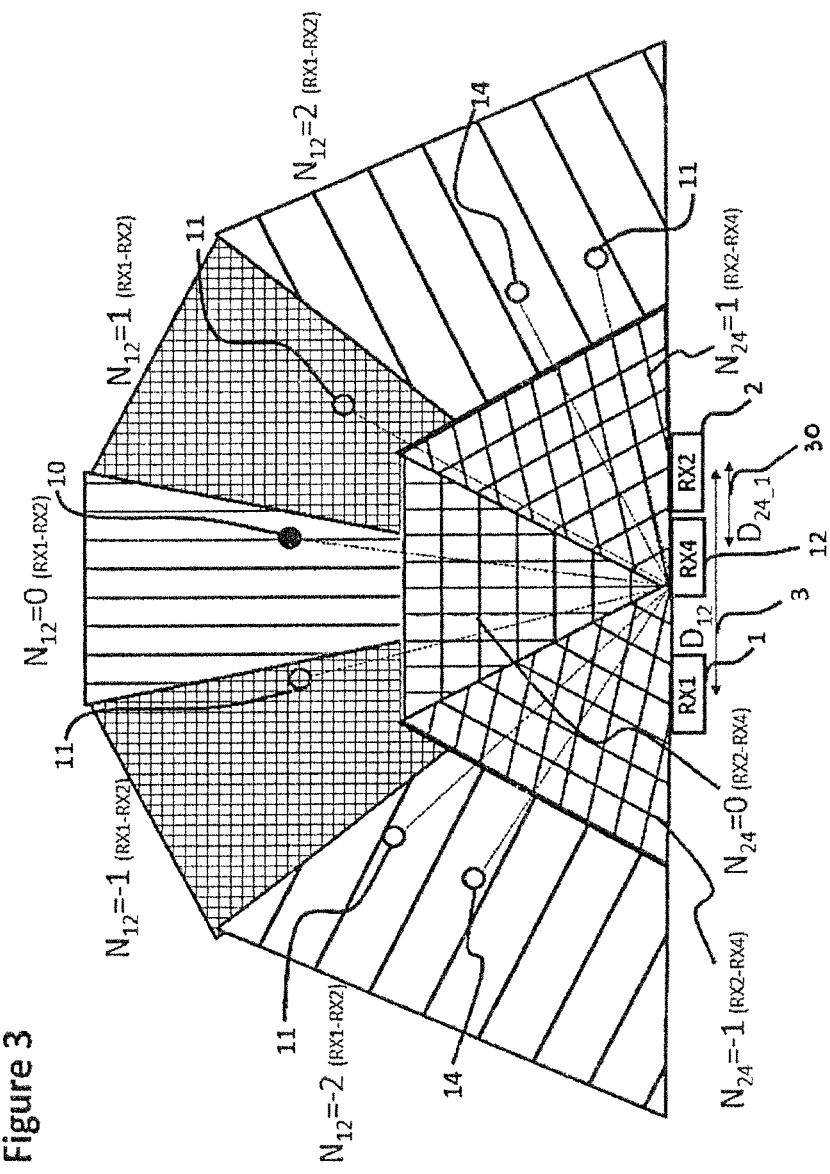
FIG. 3 illustrates a radar according to a first embodiment according to the invention.

In FIG. 3, a one-dimensional set-up is described aimed at determining a direction-of-arrival in one dimension, i.e. in relation to a line between the receiving antennas RX1 and RX2. In this embodiment, the receiving antenna (RX4) 12 is positioned at a distance 30 ($D_{24\_1}$) from the receiving antenna RX2 and is positioned on the same line that goes through receiving antennas RX1 and RX2. In this manner, the phase shift determined may be used for determining the angle or direction-of-arrival of the beam in the plane of the drawing.

Thus, sin(E) can be determined from the phase difference $\theta_{24amb}$ in radians between the received signal from the receiving antenna RX2 compared to the signal from receiving antenna RX4, see equation [6].

$$\sin(E) = \left(\frac{\theta_{24amb}}{2\pi} + N_{24}\right)\frac{\lambda}{D_{24\_1}} \quad [6]$$

When the phase differences $\theta_{12amb}$ and $\theta_{24amb}$ are determined at the same instance in time, both equations [2] and [6] need to be fulfilled. In FIG. 3, a graphical illustration, with the correct target position 10 corresponding to both $N_{12}$ and $N_{24}$ equal to 0, is shown as well as the ghost positions 14 corresponding to the ambiguity index $N_{24}$ being −1 and 1 and with the ghost positions 11 corresponding to the ambiguity index $N_{12}$ being −2, −1, 1 and 2. From FIG. 3 it is easily seen that only the correct position 10 will satisfy both the phase difference $\theta_{12amb}$ and the phase difference $\theta_{24amb}$ since none of the ghost positions 11 and 14 coincide. Consequently, the ambiguity has been resolved and the corresponding index $N_{12}$ and $N_{24}$ has been determined at one given instance in time. There are several ways to determine mathematically which pair of $N_{12}$ and $N_{24}$ that satisfies both equations [2] and [6]. One way, to do this is to minimize the term err in equation [7] using only values for $N_{12}$ that satisfy equation [3]. $N_{24}$ can be any integer value in equation [7].

$$err = \left|\frac{\theta_{24amb}}{2\pi} + N_{24} - \frac{D_{24\_1}}{D_{12}}\left(\frac{\theta_{12amb}}{2\pi} + N_{12}\right)\right| \quad [7]$$

Another way is to identify the pair of $N_{12}$ and $N_{24}$ that satisfies both equations [2] and [6] given any measured phase differences $\theta_{12amb}$ and $\theta_{24amb}$ and to simply make a two-dimensional look-up table taking $\theta_{12amb}$ and $\theta_{24amb}$ as input.

From equation [7] it is clear, that only in the case where the distance $D_{24\_1}$ is different from the distance $D_{12}$ it will be possible to determine a unique solution for $N_{12}$ and $N_{24}$.

Full 3 Dimensional Monopulse Resolving of the Phase Ambiguity

Even though real life situations exist in which the ambiguity problem may exist only in one dimension, even though direction-of-arrival or position determination is made in two or three dimensions, in the preferred environment, the ambiguity resolving technique described above is used simultaneously both vertically and horizontally, whereby a three dimensional angle to the target is obtained unambiguously and on the basis of a single received pulse reflected from the target.

Figure 4:
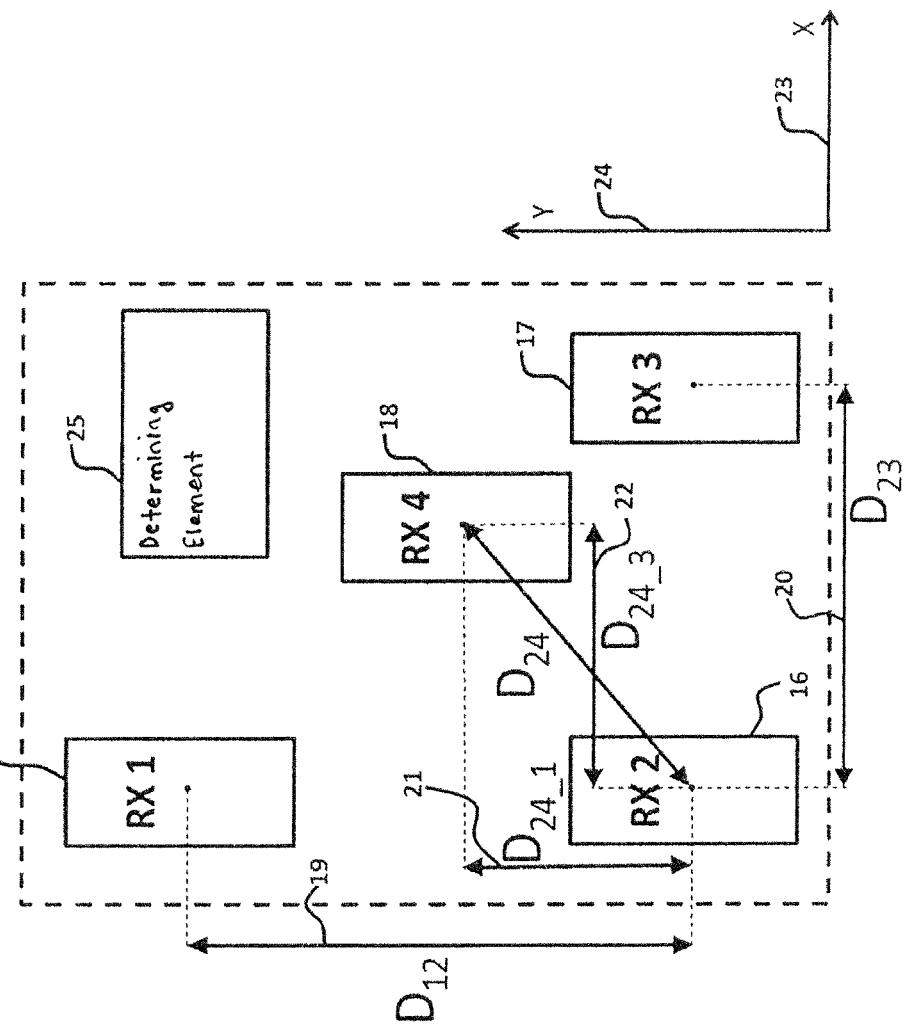
FIG. 4 illustrates a radar according to a second embodiment according to the invention.

Naturally, the set-up of FIG. 3 may be repeated for the two dimensions, but the receiver antenna configuration preferably is made as that of FIG. 4 which is a frontal view of the antenna panel. In FIG. 4, the positions of receiving antenna (RX1) 15 and (RX2) 16 define the vertical direction (Y) 24 of the antenna panel and are separated by the distance ($D_{12}$) 19, and the positions of receiving antenna (RX2) 16 and (RX3) 17 define the horizontal direction (X) 23 of the antenna panel and are separated by the distance ($D_{23}$) 20. The position of receiving antenna (RX4) 18 is vertically separated from receiving antenna RX2 by the distance ($D_{24\_1}$) 21 and horizontally separated by the distance ($D_{24\_3}$) 22. Receiving antenna RX4 is separated from RX2 by the distance ($D_{24}$):

$$D_{24} = \sqrt{D_{24_1}^2 + D_{24_3}^2}$$

Figure 5:
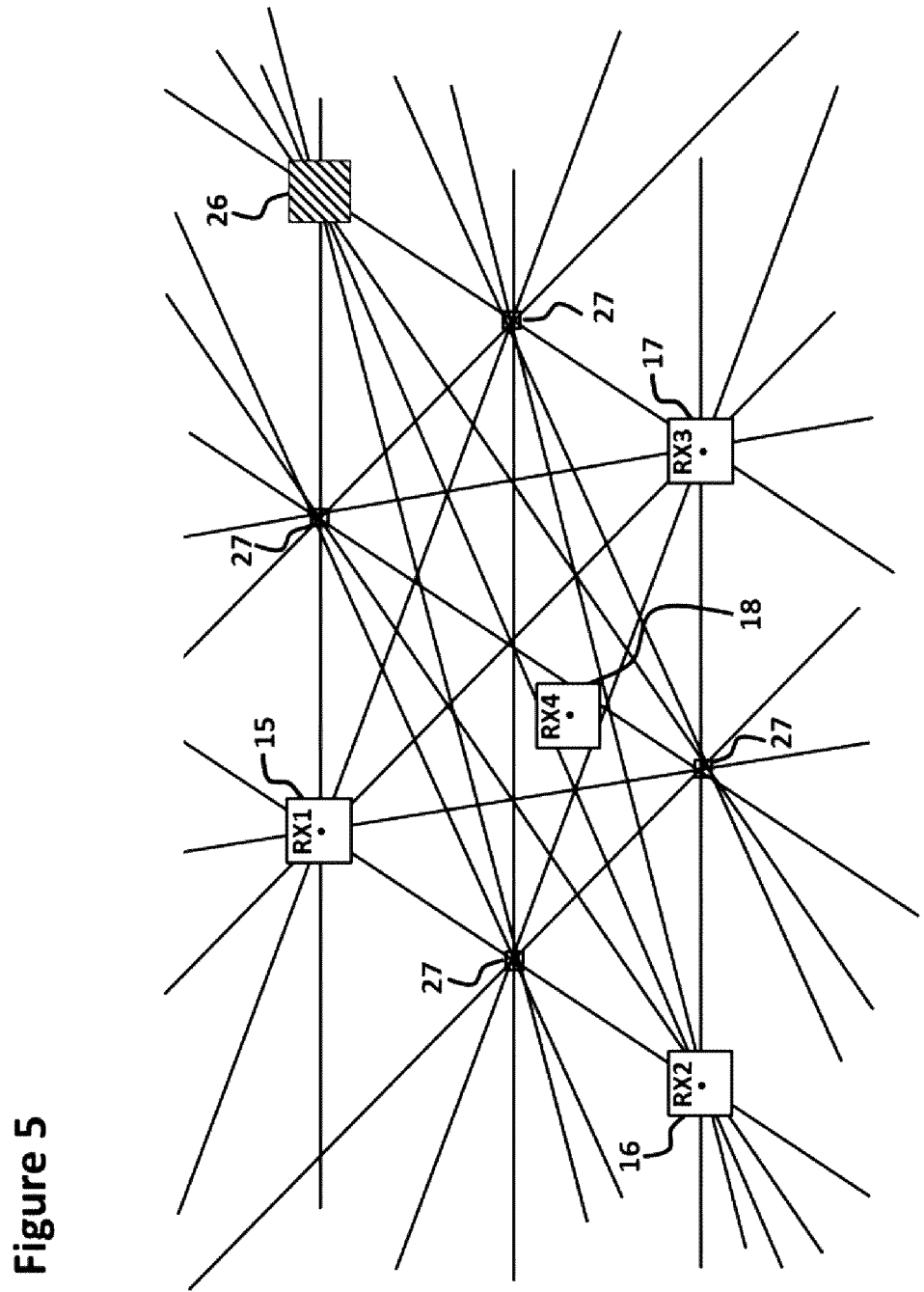
FIG. 5 illustrates the possible solutions in a parallelogram embodiment.

In FIG. 5 the position of receiving antenna (RX1) 15, (RX2) 16 and (RX3) 17 define a parallelogram. Receiving antenna (RX4) 18 needs to be positioned away from axes extending through any pair of: each of the four corners of the parallelogram 15, 16, 17 and 26 and a center point 27 of each of the four sides of the parallelogram.

In FIG. 4, the receiving antennas 15 and 16 are used to determine the vertical angle E to the target from the corresponding phase difference $\theta_{12amb}$ (e.g., see equation [2]), receiving antennas 16 and 17 are used to determine the horizontal angle A to the target from the corresponding phase difference $\theta_{23amb}$ (e.g., see equation [8]). Receiving antennas 16 and 18 are used to determine the angle P to the target from the corresponding phase difference $\theta_{24amb}$ (e.g., see equation [9]). The outputs of the receiving antennas 15, 16, 17, and 18 may be received by a determining element 25 to determine a direction-of-arrival.

$$\sin(A) = \left(\frac{\theta_{23amb}}{2\pi} + N_{23}\right)\frac{\lambda}{D_{23}} \quad [8]$$

$$\sin(P) = \left(\frac{\theta_{24amb}}{2\pi} + N_{24}\right)\frac{\lambda}{D_{24}} \quad [9]$$

From the phase difference $\theta_{12amb}$ a number of candidate angles $E_i$ is determined using the applicable $N_{12}$ in equation [2] from equation [10], in addition from the phase difference $\theta_{23amb}$ a number of candidate angles $A_i$ is determined using the applicable $N_{23}$ in equation [8] from equation [10]. Finally, from the phase difference $\theta_{24amb}$ a number of candidate angles $P_i$ is determined using the applicable $N_{24}$ in equation [9] from equation [10]. From the sets of candidate angles ($E_i$, $A_i$, $P_i$) a direction-of-arrival is determined by minimizing the sum of difference angles between the direction-of-arrival and the set of candidate angles ($E_i$, $A_i$, $P_i$). The direction-of-arrival is represented by the vertical angle E and horizontal angle A with corresponding ambiguity indexes $N_{12}$ and $N_{23}$.

$$|N_{12}| \leq \text{floor}\left(\frac{D_{12}}{\lambda} + 0.5\right), |N_{23}| \leq \text{floor}\left(\frac{D_{23}}{\lambda} + 0.5\right) \quad [10]$$

and $$|N_{24}| \leq \text{floor}\left(\frac{D_{24}}{\lambda} + 0.5\right)$$

The minimization of the three sets of candidate angles ($E_i$, $A_i$, $P_i$) can be done by minimizing the term err in equation [11] using only values for ambiguity index $N_{12}$, $N_{23}$ and $N_{24}$ that satisfy equation [10].

$$err = \left|\frac{\theta_{24amb}}{2\pi} + N_{24} - \frac{D_{24\_1}}{D_{12}}\left(\frac{\theta_{12amb}}{2\pi} + N_{12}\right) - \frac{D_{24\_3}}{D_{23}}\left(\frac{\theta_{23amb}}{2\pi} + N_{23}\right)\right| \quad [11]$$

In this example, the direction going through antennas RX1 and RX2 is perpendicular to the direction going through antennas RX2 and RX3. It should be noted that this need not be the case.

The resolving of the ambiguity outlined above can be done for every individual measurement point without using knowledge of target location in any previous point(s) in time. For a more robust solution, the ambiguity resolving can be combined with a tracking algorithm aiming at tracking an object and generating a trajectory thereof, whereby the next measurement point on the trajectory for a target is restricted to occur at the vicinity of one or more of previous measurement point, this will typically eliminate the need for solving the ambiguity. In the preferred solution, the ambiguity resolving is carried out independently on all data points belonging to the same target during the acquisition phase of the target tracking. Based on all the resolved ambiguities and the relative movement of the target during the acquisition phase, the final assessment of the starting ambiguity is determined. If a target is lost during tracking for some time making it possible to have shifted in angular ambiguity, then it is recommended to re-acquire the ambiguity indexes.

Thus, the present direction-of-arrival may be used for generating the correct track of e.g. a flying projectile, such as a golf ball or a base ball, which may be tracked by a usual radar, which may otherwise have the ambiguity. Thus, the present invention may be used in addition to the radar, or the radar may be altered to encompass the invention, whereby the present direction-of-arrival data may be used in the determination of the trajectory. In one example, the normal tracking may be used for determining the overall trajectory and the direction-of-arrival is performed only once or a few times in order to ensure that no wrong choices have been made in the radar as to solving ambiguity. If the trajectory determined does not coincide with the direction-of-arrival, the trajectory may be altered. Alternatively, all or most of the points determined of the trajectory may be determined also on the basis of a determined direction-of-arrival.

The invention claimed is:

1. A method of determining a three-dimensional direction-of-arrival of radiation impingent on a sensor having a plurality of receiving antennas each being configured to sense the radiation and output a corresponding signal, the method comprising:
   positioning the antennas so that:
     at least three of the antennas are first receiving antennas which define corners of a parallelogram having two first and two second parallel sides,
     one or more of the receiving antennas is/are a second receiving antenna(s), each second antenna forming a pair of antennas with a first antenna,
     wherein the second antenna of each pair is positioned, in relation to the first antenna with which it is paired, more than 2% of a smallest distance between two first receiving antennas away from all axes extending through any two of the four corners of the parallelogram, any corner of the parallelogram and a centre point of any of the four sides of the parallelogram, and the centre point of any of the sides of the parallelogram and the centre points of any other side of the parallelogram; and
   determining the three-dimensional direction-of-arrival from at least:
     a first phase difference between signals received by a first pair of the first receiving antennas positioned on one of the first parallel sides and a distance between the antennas of the first pair of antennas,
     a second phase difference between signals received by a second pair of the first receiving antennas positioned on one of the second parallel sides and a distance between the antennas of the second pair of antennas, and
     a third phase difference between signals received by a third pair of antennas, being a pair of antennas comprising a second receiving antenna and a first antenna, and a distance between the antennas of the third pair of antennas.

2. A method according to claim 1, wherein the impingent radiation is at least substantially periodic.

3. A method according to claim 1, further comprising the step of directing radiation toward a target which subsequently generates the impingent radiation by reflecting at least part of the radiation directed toward the target.

4. A method according to claim 1, wherein the determining step comprises:
   estimating, for each pair of receiving antennas, one or more candidate angles and subsequently,
   generating a set of candidate angles, each set of candidate angles comprising a candidate angle from each pair of receiving antennas,
   for each set of candidate angles, determining a direction and a difference angle between the direction and each candidate angle of the set,
   determining, for each set of candidate angles, a sum of the difference angles between the direction and each candidate angle of the set,
   determining a first set of candidate angles having the lowest sum and
   selecting the direction-of-arrival as the direction of the first set of candidate angles.

5. A method according to claim 1 wherein the positioning step comprises positioning the first antennas with a mutual distance of at least 0.6 times a wavelength of the impingent microwave radiation.

6. A method according to claim 5, wherein the determination step is performed on the basis of signals output simultaneously from the first and second receiving antennas.

7. A method according to claim 1, further comprising the step of directing radiation toward a target which subsequently generates the impingent radiation by reflecting at least part of the radiation directed toward the target.

8. A method according to claim 1, wherein the second receiving antenna is positioned within the parallelogram.

9. A method according to claim 1, wherein the sensor has exactly 5 receiving antennas of which three are first receiving antennas.

10. A method according to claim 1, wherein the sensor has exactly four receiving antennas of which three are first receiving antennas.

11. A method for tracking a trajectory of a target in flight, the target reflecting or emitting radiation, the method comprising:
   at least once, determining the direction-of-arrival of radiation reflected by or emitted from the target using the method of claim 1;
   tracking the trajectory using a radar; and
   correcting the trajectory using the direction-of-arrival determined.

12. A sensor for determining a three-dimensional direction-of-arrival of radiation impingent thereon, the sensor comprising no more than six receiving antennas each being configured to sense the radiation and output a corresponding signal, the antennas being positioned so that:
   at least three of the antennas are first receiving antennas defining corners of a parallelogram having two first and two second parallel sides,
   one or more of the receiving antennas is/are second receiving antenna(s), each second antenna forming a pair of antennas with another of the plurality of receiving antennas, where the antennas of each pair are positioned, in relation to each other, in the same relationship as an antenna positioned, in relation to one of the first receiving antennas, more than 2% of a smallest distance between two first receiving antennas away from all axes extending through any two of the four corners of the parallelogram, any or the corners of the parallelogram and a centre point of any of the four sides of the parallelogram, and the centre point of any of the sides of the parallelogram and the centre point of any other side of the parallelogram, and the sensor further comprising a determining element configured to receive the output signals from the first receiving antennas and the second receiving antenna(s) and determine the three-dimensional direction-of-arrival from at least:
- a first phase difference between signals received by a first pair of the first receiving antennas positioned on one of the first parallel sides and a distance between the antennas of the first pair of antennas,
- a second phase difference between signals received by a second pair of the first receiving antennas positioned on one of the second parallel sides and a distance between the antennas of the second pair of antennas, and
- a third phase difference between signals received by a third pair of antennas, being a pair of antennas comprising a second antenna, and a distance between the antennas of the third pair of antennas.

13. A sensor according to claim 12, wherein the impingent radiation is at least substantially periodic.

14. A sensor according to claim 12, further comprising a transmitter for directing radiation toward a target which subsequently may generate the impingent radiation by reflecting at least part of the radiation directed toward the target.

15. A sensor according to claim 12, wherein the determining element is configured to:
- estimate, for each pair of receiving antennas, one or more candidate angles and subsequently
- generate a plurality of sets of candidate angles, each set of candidate angles comprising a candidate angle from each pair of receiving antennas,
- for each set of candidate angles, determine a direction and a difference angle between the direction and each candidate angle of the set,
- determine, for each set of candidate angles, a sum of the difference angles between the direction and each candidate angle of the set,
- determine a first set of candidate angles having the lowest sum and
- select the direction-of-arrival as the direction of the determined first set of candidate angles.

16. A device for tracking a trajectory of a target in flight, the target reflecting or emitting radiation, the device comprising:
- a sensor according to claim 12,
- wherein the determining element is adapted to:
  - from the output signals from at least part of the antennas, derive a trajectory of the target, and
  - correct the derived trajectory using the determined direction-of-arrival.

17. A sensor according to claim 12, wherein the first antennas are positioned with a mutual distance of at least 0.6 times a wavelength of the impingent microwave radiation.

18. A sensor according to claim 17, wherein the determining element is configured to perform the determination on the basis of signals output simultaneously by the first and second receiving antennas.

19. A sensor according to claim 12, further comprising a transmitter for directing radiation toward a target from which a portion of this radiation is reflected to the sensor.

20. A sensor according to claim 12, wherein the sensor has exactly five receiving antennas of which three are first receiving antennas.

21. A sensor according to claim 12, wherein the sensor has exactly four receiving antennas of which three are first receiving antennas.

22. A sensor according to claim 12, wherein each pair of antennas includes a first receiving antenna.

* * * * *

UNITED STATES PATENT AND TRADEMARK OFFICE
CERTIFICATE OF CORRECTION

PATENT NO. : 9,958,527 B2
APPLICATION NO. : 14/365251
DATED : May 1, 2018
INVENTOR(S) : Tuxen et al.

Page 1 of 1

It is certified that error appears in the above-identified patent and that said Letters Patent is hereby corrected as shown below:

In the Claims

Column 14, Line 67:
"corners of the parallelogram, any or the corners of the" should read "corners of the parallelogram, any of the corners of the".

Signed and Sealed this
Twenty-fifth Day of June, 2019

Andrei Iancu
*Director of the United States Patent and Trademark Office*